Sept. 10, 1963

A. M. GRIECO 3,103,385

CHILDREN'S SEAT FOR USE IN VEHICLES

Filed Feb. 15, 1962

Angelo M. Grieco
INVENTOR.

BY

Sept. 10, 1963 A. M. GRIECO 3,103,385
CHILDREN'S SEAT FOR USE IN VEHICLES
Filed Feb. 15, 1962 4 Sheets-Sheet 2

Angelo M. Grieco
INVENTOR.

Sept. 10, 1963 A. M. GRIECO 3,103,385
CHILDREN'S SEAT FOR USE IN VEHICLES
Filed Feb. 15, 1962 4 Sheets-Sheet 3
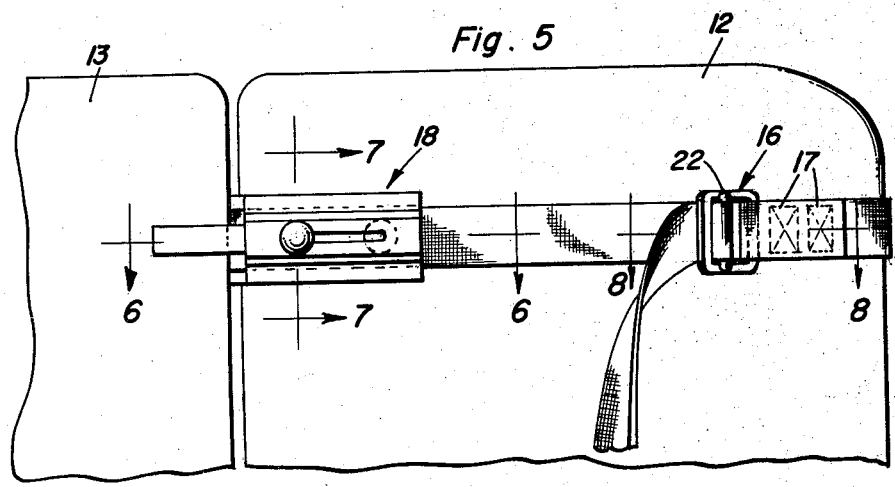
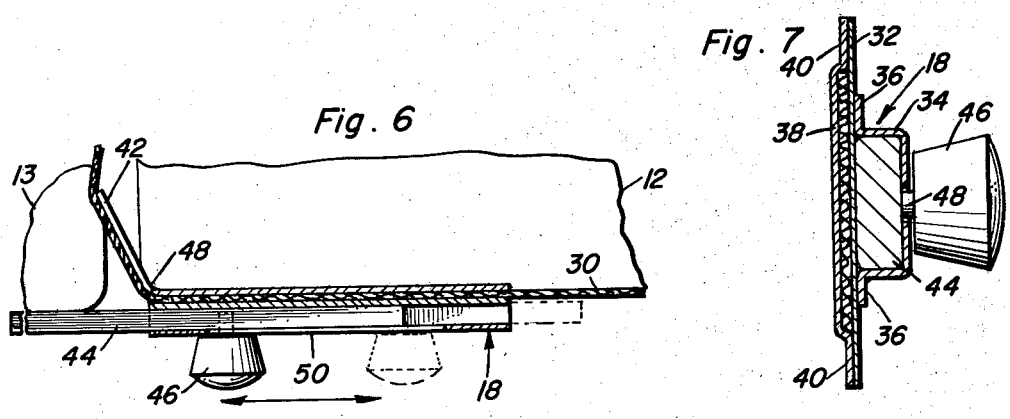
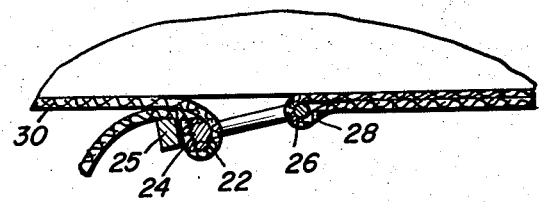
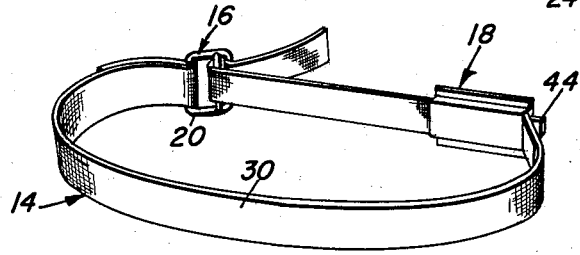
Angelo M. Grieco
INVENTOR.

Sept. 10, 1963

A. M. GRIECO 3,103,385

CHILDREN'S SEAT FOR USE IN VEHICLES

Filed Feb. 15, 1962

Angelo M. Grieco
INVENTOR.

BY *Clarence A. O'Brien*
*and Harvey B. Jacobson*
Attorneys 3,103,385
Patented Sept. 10, 1963

3,103,385
CHILDREN'S SEAT FOR USE IN VEHICLES
Angelo M. Grieco, 232 Connecticut St., Buffalo, N.Y.
Filed Feb. 15, 1962, Ser. No. 173,543
3 Claims. (Cl. 297—253)

This invention relates to supports and safety devices, and particularly to seats and straps for safely supporting and securing a small child to an automobile seat.

Briefly, the invention comprises an anchor type belt that encircles and is secured around the backrest of an automobile seat. Means are provided on the belt for preventing a pivoted backrest on which this invention is secured from pivoting forwardly when the vehicle is suddenly decelerated. A child's safety seat or chair is hooked to the belt so that it cannot come loose during impact but it is yet freely removable therefrom when desired. The seat also includes a safety strap for adjustably securing a child in the safety seat. The seat may, when desired, be removed and replaced by a body strap which also hooks onto the belt. The body strap permits the child to stand on the automobile seat in an upright position, yet prevents the child from being thrown forwardly during deceleration of the vehicle.

Accordingly, it is a primary object of the invention to provide new and improved devices for securing a child in either a sitting or standing position to an automobile seat in a manner more safely than previous devices.

It is another object of the invention to provide devices for supporting a child and securing him to an automobile seat which is relatively simple in design, economical to manufacture and durable in use.

It is another object of the invention to provide a device for securing a child to an automobile seat and which includes means for preventing the back of the seat from pivoting forwardly during deceleration.

It is another object of the invention to provide a device for securing a child to an automobile seat in a sitting position and which adjustably locks the child to the device.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 5 is an elevational view of the back of the automobile seat shown in FIGURE 1 with the seat belt of my invention thereon;

FIGURE 6 is an enlarged cross-sectional view taken substantially on the plane of line 6—6 in FIGURE 5;

FIGURE 7 is an enlarged vertical cross-sectional view taken substantially on the plane of line 7—7 in FIGURE 5;

FIGURE 8 is an enlarged cross-sectional view taken substantially on the plane of line 8—8 in FIGURE 5;

FIGURE 9 is a perspective view of my novel seat belt;

Figure 1:
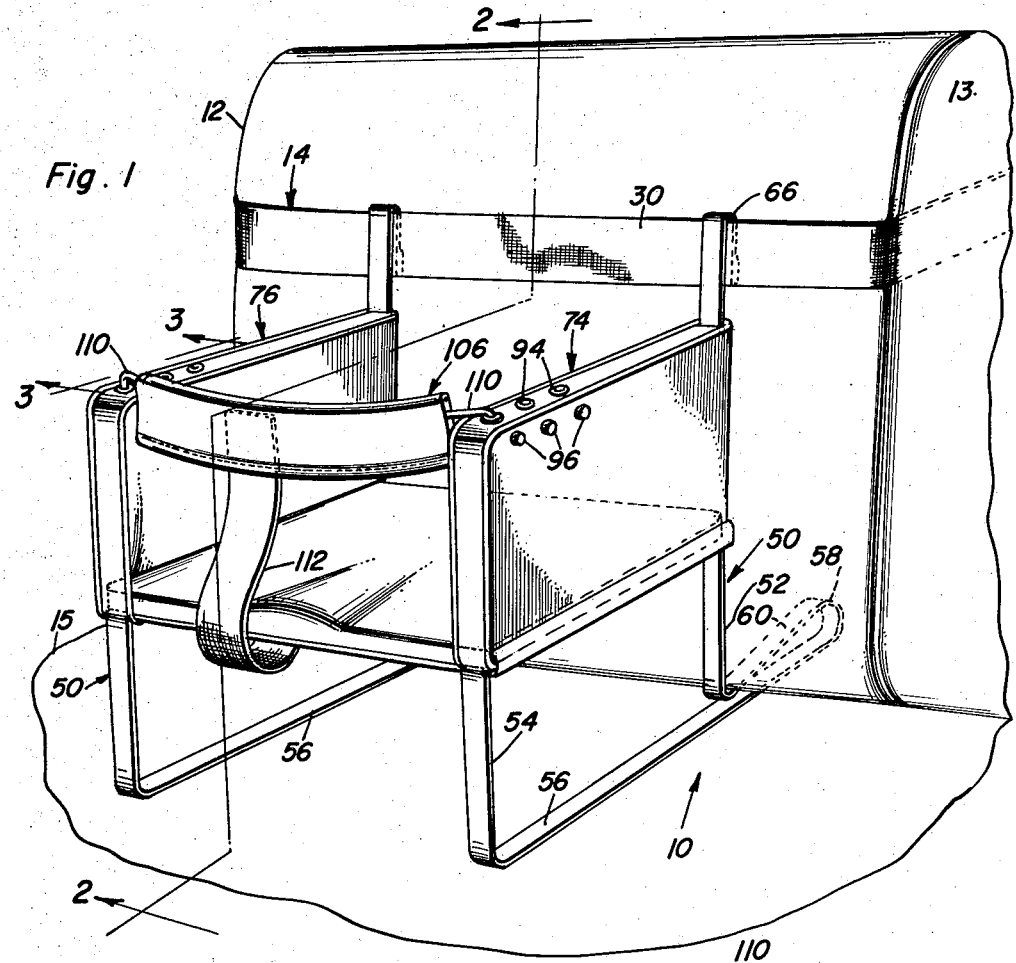
FIGURE 1 is a perspective view illustrating my novel seat connected to a pivoted type of backrest on an automobile seat.
Figure 3:
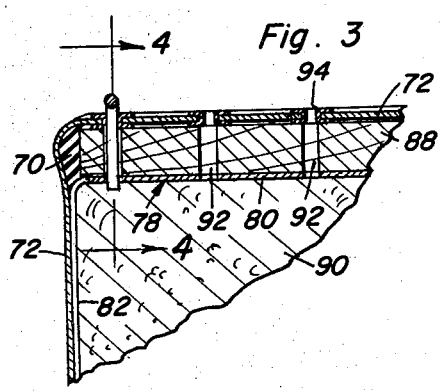
FIGURE 3 is a fragmentary vertical cross-sectional view through a portion of one side of the seat and taken substantially on the plane of line 3—3 in FIGURE 1.
Figure 4:
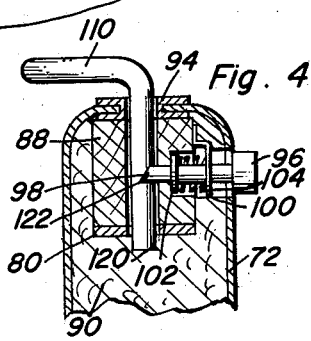
FIGURE 4 is an enlarged cross-sectional view taken substantially on the plane of line 4—4 in FIGURE 3.
Figure 2:
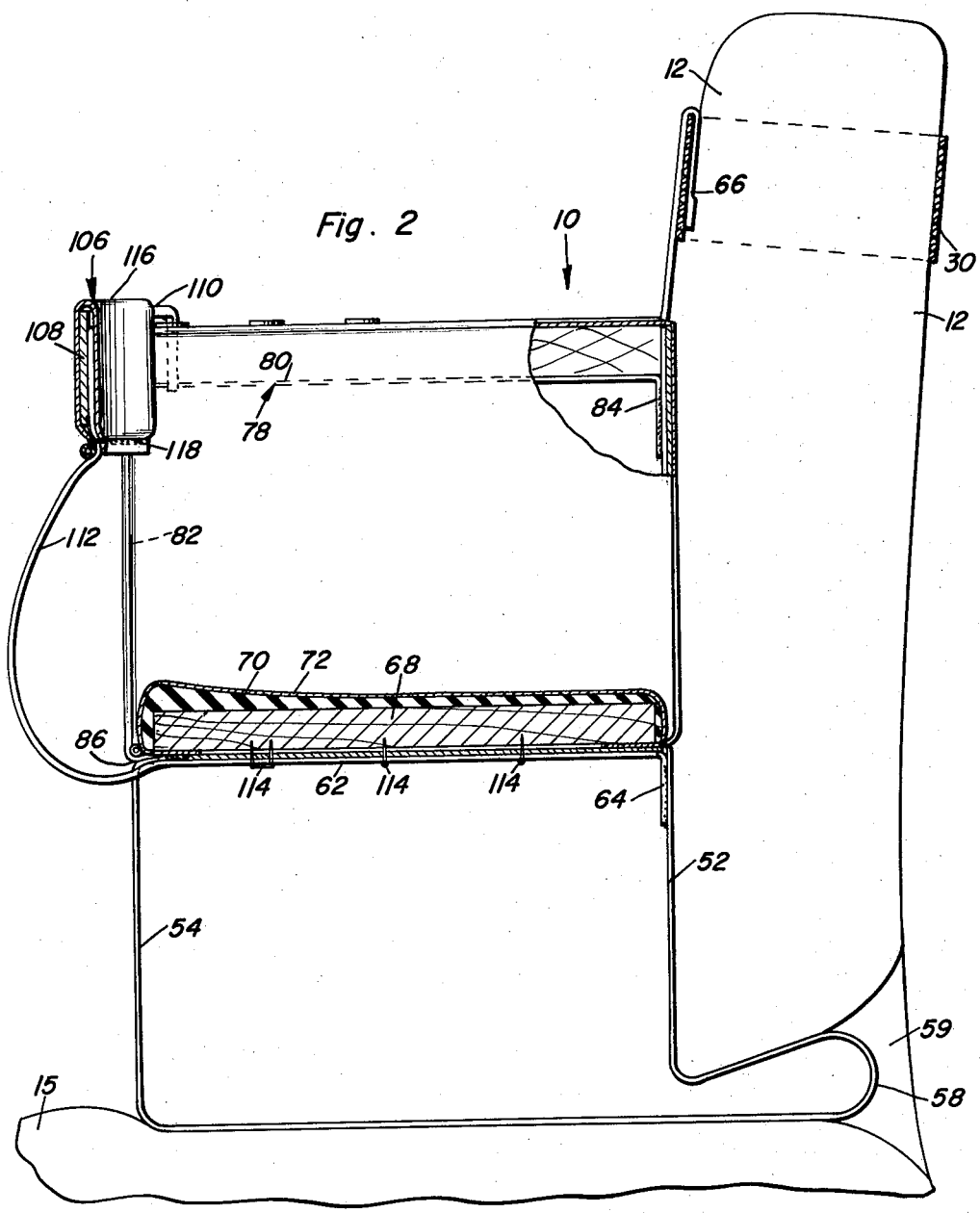
FIGURE 2 is an enlarged vertical cross-sectional view taken substantially on the plane of line 2—2 in FIGURE 1 looking in the direction of the indicating arrows.

With continuing reference to the drawings wherein identical reference numerals indicate the same parts, it can be seen that the child's safety seat or chair 10 is connected to the backrest 12 of an automobile seat by means of an anchor type belt 14. As shown in FIGURES 1, 2 and 5, this anchoring belt 14 encircles and extends completely around the backrest portion 12 and is urged tightly and securely into engagement therewith by means of a buckle 16. As shown, the backrest 12 comprises one-half of the back of an automobile seat and is the type used in a conventional two-door sedan. Backrest 12 is pivoted to the automobile seat member or cushion 15 at its bottom edge and normally must be pivoted forwardly in order for passengers to gain access to the rear seat of the automobile. It is readily apparent that the safety seat 10 and the upper portion of the backrest 12 would rapidly pivot forwardly during quick deceleration of the vehicle or in case of a collision. This could obviously result in separation of the seat 10 and backrest 12 with resulting serious injury to the child in the seat 10. To prevent forward movement of the backrest 12, I provide a locking device 18 on the anchoring belt 14.

The buckle 16 includes a substantially rectangular frame 20 with a rod 22 extending across the central portion of the frame. As shown in FIGURES 8 and 9, the rod 22 is semicircular in cross section and one side thereof is provided with longitudinally extending teeth 24. The ends of the rod 22 are slidably connected to the upper and lower sides of the frame 20. The back portion of the frame includes a round bar 26 which is secured within a loop 28 formed by folding one end of the belt 30 around the bar 26 back upon itself and sewing the overlapping end portions of the belt together as shown at 17.

Locking device 18 as shown in FIGURES 5 through 7 comprises a rectangular box-like housing including a backplate 32. A plate 34 formed into a U-shaped channel is secured to the backplate 32 by means of outwardly extending flanges 36 welded to the backplate. A channel member 38 of U-shaped cross section is also secured to the opposite side of the backplate 32 by means of outwardly extending flanges which are spot-welded to the backplate. As shown in FIGURE 6, one end portion of the channel member 38 is deflected away from the backplate 32 at a substantially 75 degree angle as shown at 42.

A bolt 44 is slidably received in the U-shaped plate 34 and is secured therein by means of a handle 46 having a pin 48 which extends through an elongated slot 50 in the plate 34 and is secured to the bolt 44. The belt 30 normally slidably extends through the channel member 38. In operation, the free end of the belt is looped around the rod 22 and between the teeth 24 and the forward edge of the buckle as shown in FIGURE 8. The free end of the belt is then tightly pulled to tighten the belt 30 around the seat backrest 12. As the belt is tightened, the rod 22 slides forwardly to grip the belt between the teeth 24 and the forward bar 25 of the belt buckle.

Before the belt is tightened, the locking device 18 is moved to the back inside corner 48 of the seat 12 as shown in FIGURE 6 so that the end portion 42 extends between the backrests 12 and 13. The bolt 14 is then moved by means of the handle 46 so that one end thereof overlaps the backrest 13. Thus, it is apparent that during rapid decelerations of the vehicle, the driver's back will normally maintain the backrest 13 in an upright position and the locking means 18 will secure the backrest 12 to the backrest 13 so as to prevent it from pivoting forwardly. In many cases, the backrest 13 will be rigid with the seat portion 15.

The child's seat 10 comprises two leg frames or members 50 of identical construction. Each of these side frame members is composed of an integral metal strip bent to form a relatively long vertical rear leg 52, a parallel vertically extending front leg 54, and a bottom support portion or member 56 connected to the rear leg 52 by means of a U-shaped bend 58 and a connecting portion 60. The side frame members also include a seat support portion 62 which is deflected rearwardly from the upper end of the front leg 54 and welded to the rear leg 52 by means of a downwardly extending flange 64. The upper ends of the rear legs 50 are deflected into U-shaped hooks 66 the depending terminal or bill portions being engaged with and removably hooked over selected portions of the belt 30.

The bottom of the seat 10 comprises a substantially rectangular wooden plank 68 having its front and rear edges and its upper surface covered by foam rubber padding 70 and a plastic covering 72 which overlaps the bottom of the plank 68 and may be secured thereto by conventional means such as tacks or staples.

The seat 10 also includes a pair of arms 74 and 76 which are duplicates of one another. Each arm includes an L-shaped frame 78 which has a pair of arms 80 and 82 at right angles to one another and end flanges 84 and 86 all bent from one integral piece of metal stripping. The flanges 84 and 86 are secured as by welding to the rear leg 52 and seat support portion 62 of the side frames. Plank 68 is secured on supports 62.

Wooden strips 88 extend along the upper surfaces of the arms 80 and are secured thereto by conventional means such as screws or cement. The hollow portion of the arms within the L-shaped members 78 is filled with cotton padding 90. The entire arm assemblies are covered with plastic material 72.

A plurality of spaced vertically extending bores 92 are provided in the strips 88 and arms 80. These bores also extend through the plastic material 72 and the holes in the plastic material are reinforced by brass grommets 94.

The upper side portions of each arm 74 and 76 are also provided with a plurality of horizontal bores which intersect the vertical bores 92. Slidably mounted in each horizontal bore is a stud 96 which has a tapered end 98. Each stud also extends through a bore in a bracket 100 which is fixed to the outer side of the wooden strip 88. Each stud is also provided with an annular flange 102 and a coil spring compressed between the annular flange 102 and bracket 100.

A safety strap 106 extends across a front portion of the seat 10. The safety strap 106 includes a flexible band 108 which may be composed of heavy canvas webbing or a flexible strip of sheet metal. Secured to the ends of the band 108 are two metallic L-shaped hook members 110. These hook members are preferably formed of a rod which is circular in cross section. A vertically extending crotch strap 112 composed of flexible webbing is connected at its upper end to the band 108 and its bottom end is folded under the seat plank 68 and secured thereto by staples 114. The entire flexible band 108 is covered by a strip of plastic material 116 which is folded over the top of the band and sewed together along its bottom edge as shown at 118.

The ends of the L-shaped hooks 110 are provided with chamfered portions 120 which act as cam surfaces for camming the studs 96 outwardly when the hooks are inserted into the bores 92. Each hook is also provided with a notch 122 for receiving an end of one of the studs 96.

In operation, after the seat belt 14 has been installed on the backrest 12 as explained above, the hooks 66 are inserted over the belt 30 and the seat 10 is then pivoted so as to insert the U-shaped bends 58 into the space 59 between the backrest 12 and seat portion 15. The child is then inserted into the seat 10 in an obvious manner so that his legs extend under the safety strap 106 and straddle the crotch strap 112.

Figure 10:
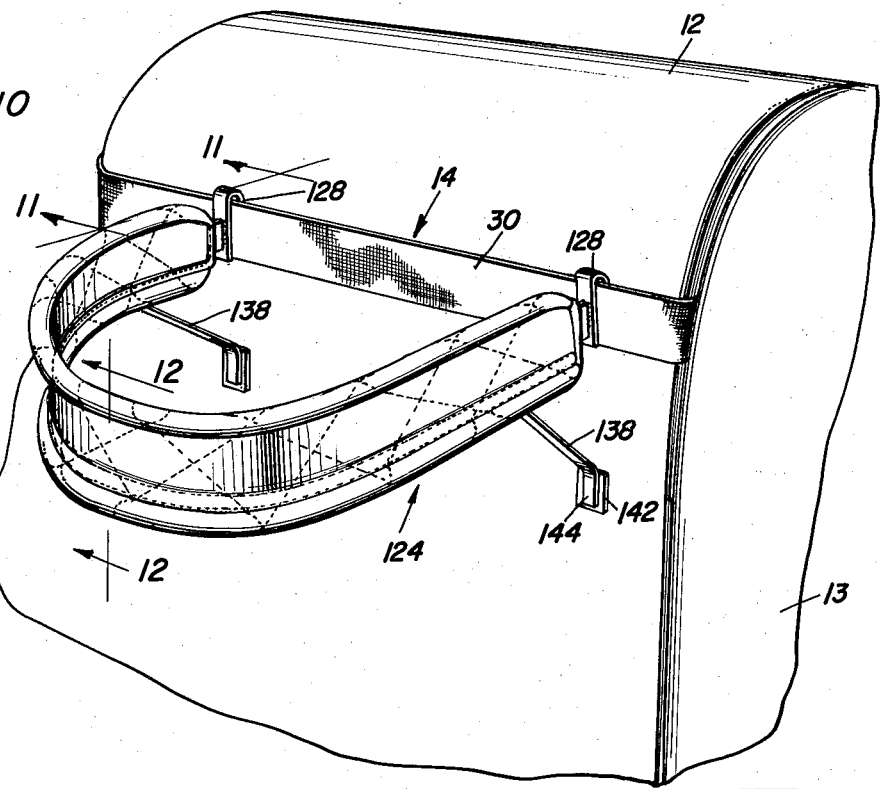
FIGURE 10 is a perspective view of my novel body strap secured to the pivoted backrest of an automobile seat.
Figure 11:
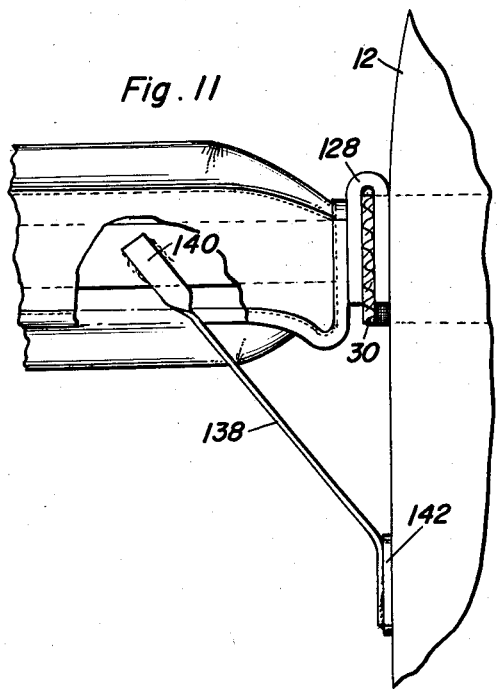
FIGURE 11 is an enlarged cross-sectional view taken substantially on the plane of line 11—11 in FIGURE 10.
Figure 12:
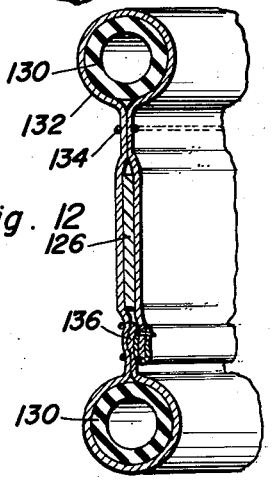
FIGURE 12 is a vertical cross-sectional enlarged view taken substantially on the plane of line 12—12 in FIGURE 10.

If it is desired to secure the child to the automobile seat in a standing position, the seat 10 is then removed and the corral-type body strap 124 shown in FIGURES 10 through 12 is installed on the seat belt 14. The body strap 124 includes a thin flexible steel band 126 welded to two U-shaped hooks 128 at its ends. Flexible rubber tubing 130 is provided adjacent each edge of the band 126 in spaced relationship thereto. The band and tubing is covered by a sheet of plastic material 132 whose opposite sides are stitched together at 134 and 136 between the band and tubing. The plastic material 132 may be composed of two thin sheets of material with matting therebetween for more effective cushioning.

Diagonal bracing arms 138 are secured to the bottom edges of the band 126. The arms 138 are twisted at their upper ends to provide portions 140 parallel with the band which are welded thereto. The bottom ends of the arms 138 are deflected downwardly substantially coplanar with the belt receiving space within the hooks 128. Pressure distributing pads 142 are secured to the bottom portions 144 of the arms 138.

Body strap 124 while permitting a child to stand on the seat portion 15, effectively prevents him from falling or being thrown forwardly when the vehicle decelerates. The rubber tubing 130 and the covering material 132 provide effective cushioning for the edges of the band 126.

While the seat 10 and strap 124 are easily installed, removed and interchanged, they cannot work loose while in use.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination, a vehicle seat structure embodying a horizontal seat member and a vertical upstanding backrest, an anchoring belt for a readily attachable and detachable child's safety chair securely encircling a median portion of the backrest between the upper and lower portions of the backrest, said belt being provided with separably and adjustably connectible terminal end portions, a safety chair having a seat portion provided at ends thereof with depending leg means, said leg means resting firmly but removably atop said seat member and having rearwardly projecting chair and leg anchoring members at lower corner portions forcibly but removably wedged between an edge portion of said seat member and an overlying bottom edge portion of said backrest, said seat portion having opposed upstanding end frames each including an armrest, a pair of vertical spaced parallel chair attaching and retaining hooks positioned directly above their respectively depending leg means, said retaining hooks having portions thereof rigidly joined to adjacent cooperating rearward portions of the respective armrests, and also bill portions engaged releasably over selected upper edge portions of said anchoring belts and interposed between said belts and coacting surface portions of the backrest, a safety strap for the occupant of the chair extending across and spaced between the forward ends of said armrests and having means at the respective outer ends thereof detachably and adjustably connected to the respective armrests, and a crotch strap cooperating with said safety strap and at right angles thereto and having an upper end thereof secured to a median portion of the safety strap and having a lower end portion secured to an underneath side of said seat portion ends thereof detachably connecting said ends to said armrests.

2. For use on and in association with a vehicle seat construction having a horizontal seat member provided with an accompanying upstanding backrest, said backrest having an encircling chair anchoring belt, a readily attachable and detachable child's safety chair embodying a horizontal seat portion provided at ends thereof with upstanding armrests, said armrests being provided at forward top portions thereof with selectively usable sockets, a horizontal safety occupant confining safety strap extending across the upper forward portion of the seat and spanning the space between the said armrests and provided at ends thereof with depending hooks, said hooks being releasably seated in selectively usable sockets, said armrests being provided at the rearward ends thereof with upstanding belt-engaging hooks and said hooks being spaced apart and designed and adapted to be releasably over intended portions of said belt, and leg frames attached to and depending from the respective end portons of said seat and having rigid members designed and adapted to rest lengthwise atop said vehicle seat member.

3. The structure defined in claim 2 and wherein said frames embody forward and rearward vertical legs having connecting memebrs between lower portions thereof, the rearward legs being provided with outstanding anchoring and retaining members and said members being disposed directly below and in cooperative alignment with the respective belt-engaging hooks and having terminal end portions which are adapted to be wedged into an existing space between the bottom of the backrest and an underlying adjacent edge portion of said seat.

References Cited in the file of this patent

UNITED STATES PATENTS

| | | |
|---|---|---|
| 1,527,878 | Kolber | Feb. 24, 1925 |
| 1,680,794 | Lawler | Aug. 14, 1928 |
| 2,470,834 | Peltier | May 24, 1949 |
| 2,633,906 | Franz | Apr. 7, 1953 |
| 2,689,604 | Hourruitiner | Sept. 21, 1954 |
| 2,739,641 | Singleton | Mar. 27, 1956 |
| 2,751,967 | Sitterley | June 26, 1956 |
| 2,857,956 | Thompson | Oct. 28, 1958 |
| 2,941,578 | Mann | June 21, 1960 |
| 2,960,149 | Throssel | Nov. 15, 1960 |

FOREIGN PATENTS

| | | |
|---|---|---|
| 270,051 | Great Britain | May 5, 1927 |